(12) United States Patent
Bech

(10) Patent No.: US 11,840,038 B2
(45) Date of Patent: Dec. 12, 2023

(54) WIND TURBINE BLADE MANUFACTURE

(71) Applicant: Vestas Wind Systems A/S, Aarhus (DK)

(72) Inventor: Anton Bech, Ciudad Real (ES)

(73) Assignee: Vestas Wind Systems A/S, Aarhus N (DK)

( * ) Notice: Subject to any disclaimer, the term of this patent is extended or adjusted under 35 U.S.C. 154(b) by 304 days.

(21) Appl. No.: 17/298,764

(22) PCT Filed: Dec. 2, 2019

(86) PCT No.: PCT/DK2019/050375
§ 371 (c)(1),
(2) Date: Jun. 1, 2021

(87) PCT Pub. No.: WO2020/114564
PCT Pub. Date: Jun. 11, 2020

(65) Prior Publication Data
US 2022/0055330 A1    Feb. 24, 2022

(30) Foreign Application Priority Data
Dec. 3, 2018 (DK) .......................... PA2018 70792

(51) Int. Cl.
  *B29D 99/00*   (2010.01)
  *B29C 65/48*   (2006.01)
  (Continued)

(52) U.S. Cl.
  CPC .......... *B29D 99/0028* (2013.01); *B29C 65/48* (2013.01); *B29C 65/782* (2013.01);
  (Continued)

(58) Field of Classification Search
  CPC ............ B29D 99/0025; B29D 99/0028; F03D 1/0675; F03D 1/0683; B29L 2031/085;
  (Continued)

(56) References Cited

U.S. PATENT DOCUMENTS

2004/0011927 A1* 1/2004 Christman ........ B29C 66/72525
                                                    244/131
2010/0003141 A1* 1/2010 Hancock ............ B29D 99/0028
                                                    416/223 R
(Continued)

FOREIGN PATENT DOCUMENTS

DE   102004046072 A1   4/2006
EP       2843227 A1   3/2015
(Continued)

OTHER PUBLICATIONS

European Patent Office, Examination Report in EP Application No. 19816525.0, dated Jul. 19, 2022.
(Continued)

*Primary Examiner* — John M Zaleskas
(74) *Attorney, Agent, or Firm* — Wood Herron & Evans LLP

(57) ABSTRACT

A method of making a wind turbine blade (10) having a shear web (20, 22) bonded between first and second half shells (16, 18) is described. The method involves providing a web locator (40) on an inner surface of a half shell. The web locator has a fixed portion (42) and a spring portion (44) extending from the fixed portion. The spring portion is moveable relative to the fixed portion between compressed and relaxed states.

14 Claims, 8 Drawing Sheets

(51) Int. Cl.
*B29C 65/78* (2006.01)
*B29C 65/00* (2006.01)
*F03D 1/06* (2006.01)
*B29L 31/08* (2006.01)

(52) U.S. Cl.
CPC ........ *B29C 65/7805* (2013.01); *B29C 66/112* (2013.01); *B29C 66/1122* (2013.01); *B29C 66/131* (2013.01); *B29C 66/532* (2013.01); *B29C 66/543* (2013.01); *B29C 66/8262* (2013.01); *B29D 99/0025* (2013.01); *F03D 1/0675* (2013.01); *B29L 2031/085* (2013.01); *F05B 2230/50* (2013.01)

(58) Field of Classification Search
CPC ..... Y02E 10/72; B29C 65/48; B29C 65/7805; B29C 65/782; B29C 66/112; B29C 66/1122; B29C 66/131; B29C 66/532; B29C 66/54; B29C 66/543; B29C 66/636; B29C 66/8262
See application file for complete search history.

(56) References Cited

U.S. PATENT DOCUMENTS

| | | | | |
|---|---|---|---|---|
| 2012/0027613 | A1* | 2/2012 | Yarbrough | F03D 1/065 416/226 |
| 2014/0294591 | A1* | 10/2014 | Liu | F03D 1/0675 156/293 |
| 2015/0152838 | A1* | 6/2015 | Merzhaeuser | F03D 1/0675 29/889.71 |
| 2015/0308404 | A1* | 10/2015 | Dahl | B29D 99/0028 156/60 |
| 2015/0314537 | A1* | 11/2015 | Dahl | B29C 70/541 264/510 |
| 2017/0050372 | A1* | 2/2017 | Nielsen | F03D 1/0675 |
| 2017/0074240 | A1* | 3/2017 | Caruso | B29C 66/112 |
| 2017/0151711 | A1* | 6/2017 | Birkemose | B29C 66/721 |
| 2018/0216602 | A1* | 8/2018 | Bech | F16F 1/3732 |
| 2018/0328335 | A1* | 11/2018 | Smith | F03D 1/065 |
| 2020/0080542 | A1* | 3/2020 | Monie | F03D 1/0683 |
| 2020/0147912 | A1* | 5/2020 | Thomsen | B29C 66/1142 |
| 2020/0332763 | A1* | 10/2020 | Keohan | F03D 1/0675 |
| 2021/0102523 | A1* | 4/2021 | Smith | B29C 66/112 |
| 2021/0180560 | A1* | 6/2021 | Preston | B29C 65/5057 |
| 2021/0340949 | A1* | 11/2021 | Monie | B29D 99/0025 |

FOREIGN PATENT DOCUMENTS

| | | |
|---|---|---|
| WO | 2014096002 A2 | 6/2014 |
| WO | 2015024573 A1 | 2/2015 |
| WO | 2015197076 A1 | 12/2015 |
| WO | 2017088890 A1 | 6/2017 |

OTHER PUBLICATIONS

Danish Patent and Trademark Office, Search and Examination Report in PA 2018 70792, dated May 29, 2019.

European Patent Office, International Search Report and Written Opinion in PCT Application No. PCT/DK2019/050375, dated Feb. 20, 2020.

* cited by examiner

… …

WIND TURBINE BLADE MANUFACTURE

TECHNICAL FIELD

The present invention relates generally to the manufacture of wind turbine blades, and more specifically to a method and associated apparatus for positioning shear webs during blade manufacture.

BACKGROUND

Wind turbine blades, such as the long blades employed on modern utility-scale wind turbines, generally comprise a hollow blade shell made primarily of composite materials, such as glass-fibre reinforced plastic. The blade shell is typically made up of two half shells, a windward shell and a leeward shell, of laminate construction. The half shells are bonded together along flanges at the leading and trailing edges of the blade. To provide structural support, one or more shear webs are typically bonded inside the blade between opposed inner surfaces of the windward and leeward half shells.

The blade is formed in a blade mould assembly consisting of two female mould halves (a windward mould and a leeward moulds), which are moveable between an open and a closed configuration. In the open configuration, the mould halves may be arranged side-by-side, whilst in the closed configuration one of the mould halves may be arranged upside down on top of the other mould half. The windward and leeward shells are initially formed in the respective windward and leeward mould halves with the mould assembly in the open configuration. Thereafter, the shear webs are positioned inside one of the half shells. Adhesive is applied to the bonding interfaces of the shells and shear webs and the mould assembly is closed to bond the half shells together and to bond the shear webs between the half shells.

Significant challenges arise during the blade manufacturing process. In particular, it is challenging to ensure accurate positioning of the shear webs relative to the half shells. It is also difficult to ensure consistent adhesive bondlines on both sides of the shear web between the respective half shells. Particular challenges arise when the shear webs are to be bonded to inclined surfaces of the blade shells, such as in the case of a trailing-edge web, which is bonded between steeply inclined surfaces near the trailing edge of the blade. In this case, the reaction forces resulting from compression of adhesive in the shear web bond lines may cause the web to be moved out of position in a chordwise direction towards the leading edge of the blade when the mould is closed. The chordwise positioning of the web relative to inclined shell portions can significantly affect the bond line thicknesses between the shear web and the blade shells. In particular, inaccuracies in web position may result in inconsistent bondlines. For example, the bond lines may vary in thickness across their width, and/or the bondlines may have different thicknesses on each side of the shear web.

Against this background, it is an object of the present invention to provide an improved process and associated apparatus for making wind turbine blades that ensures consistency in the bond lines between the shear webs and the blade shells.

SUMMARY OF THE INVENTION

According to a first aspect of the present invention there is provided a method of making a wind turbine blade, the wind turbine blade extending longitudinally in a spanwise direction and extending transversely in a chordwise direction between a leading edge and a trailing edge, the method comprising:

a. providing a first half shell and a second half shell to be joined together, each half shell comprising an inner surface having concave curvature in the chordwise direction such that portions of the inner surface are inclined relative to a local chord of the blade;
  b. defining a shear web mounting region on an inclined portion of the inner surface of a half shell;
  c. providing a web locator having a fixed portion and a spring portion extending from the fixed portion, the spring portion being moveable relative to the fixed portion between compressed and relaxed states, and the spring portion being biased towards the relaxed state,
  d. attaching the fixed portion of the web locator to an inner surface of a half shell proximate to the mounting region such that at least part of the spring portion extends in front of the mounting region;
  e. providing a shear web having a mounting flange for bonding to the mounting region;
  f. providing adhesive on the mounting flange and/or on the mounting region;
  g. bringing the first and second half shells together with the shear web arranged therebetween, such that the mounting flange is guided by a surface of the spring portion of the web locator towards the mounting region and the spring portion compresses; and
  h. compressing and curing the adhesive.

The spring portion of the web locator in a compressed state exerts a first chordwise force on the shear web that counteracts a second chordwise force on the shear web exerted by the adhesive, and the first and second chordwise forces cause chordwise movement of the shear web until the mounting flange reaches an equilibrium position within the mounting region where the first and second chordwise forces are equal.

The shear web may be a trailing edge web for location near the trailing edge of the blade. In this case the method may comprise attaching the web locator on a leading-edge side of the shear web mounting region. The web locator urges the shear web towards the trailing edge when the half shells are brought together.

Prior to attaching the web locator to the inner surface of the half shell, the method may comprise accurately positioning the web locator on the inner surface using a positioning tool attached to a predetermined location of a blade mould in which the half shell is supported. The positioning tool may comprise an arm that is pivotally connected to the blade mould. The positioning tool is preferably attached to a trailing edge of the blade mould, or to some other datum point on the mould or elsewhere.

The method may comprise attaching a pair of web locators respectively on a leading-edge side and a trailing-edge side of the shear web mounting region. The web locators may be configured to engage with the mounting flange or with a tab attached to the mounting flange such that the shear web is stabilised by the web locators and prevented from tipping.

According to a second aspect of the present invention there is provided a web locator comprising a fixed portion for attaching to an inner surface of a wind turbine blade half shell; and a spring portion for guiding a shear web towards a mounting region on the inner surface of the half shell, the spring portion being moveable relative to the fixed portion between compressed and relaxed states, and the spring portion being biased towards the relaxed state.

The spring portion may preferably be configured to exert a chordwise force on the shear web in use when in a compressed state.

The web locator may comprise a portion configured to allow the spring portion to move relative to the fixed portion. The portion is preferably a flexible portion. The portion may comprise a hinge.

In a particular example described herein, the spring portion is V-shaped. In another example the web locator has a swan profile in which the spring portion comprises a curved neck. The fixed portion of the web locator preferably comprises a base, for example a planar base.

The spring portion of a web locator may comprise a groove for receiving an edge portion of the shear web mounting flange or an edge portion of a tab attached to the mounting flange.

The web locator is preferably a pultruded component. Or, the web locator could be a moulded part.

According to a third aspect of the present invention there is provided a wind turbine blade comprising first and second half shells bonded together, and a shear web bonded inside the blade between respective inner surfaces of the half shell, wherein the wind turbine blade further comprises one or more web locators as described above attached to the inner surface of the first and/or second half shell. The or each web locator is preferably in a compressed state in the blade.

Optional features described above in relation to one aspect of the invention apply equally to the other aspects. Repetition of features is avoided for reasons of conciseness.

BRIEF DESCRIPTION OF THE DRAWINGS

Non-limiting examples of the present invention will now be described with reference to the accompanying drawings, in which.

DETAILED DESCRIPTION

Figure 1:
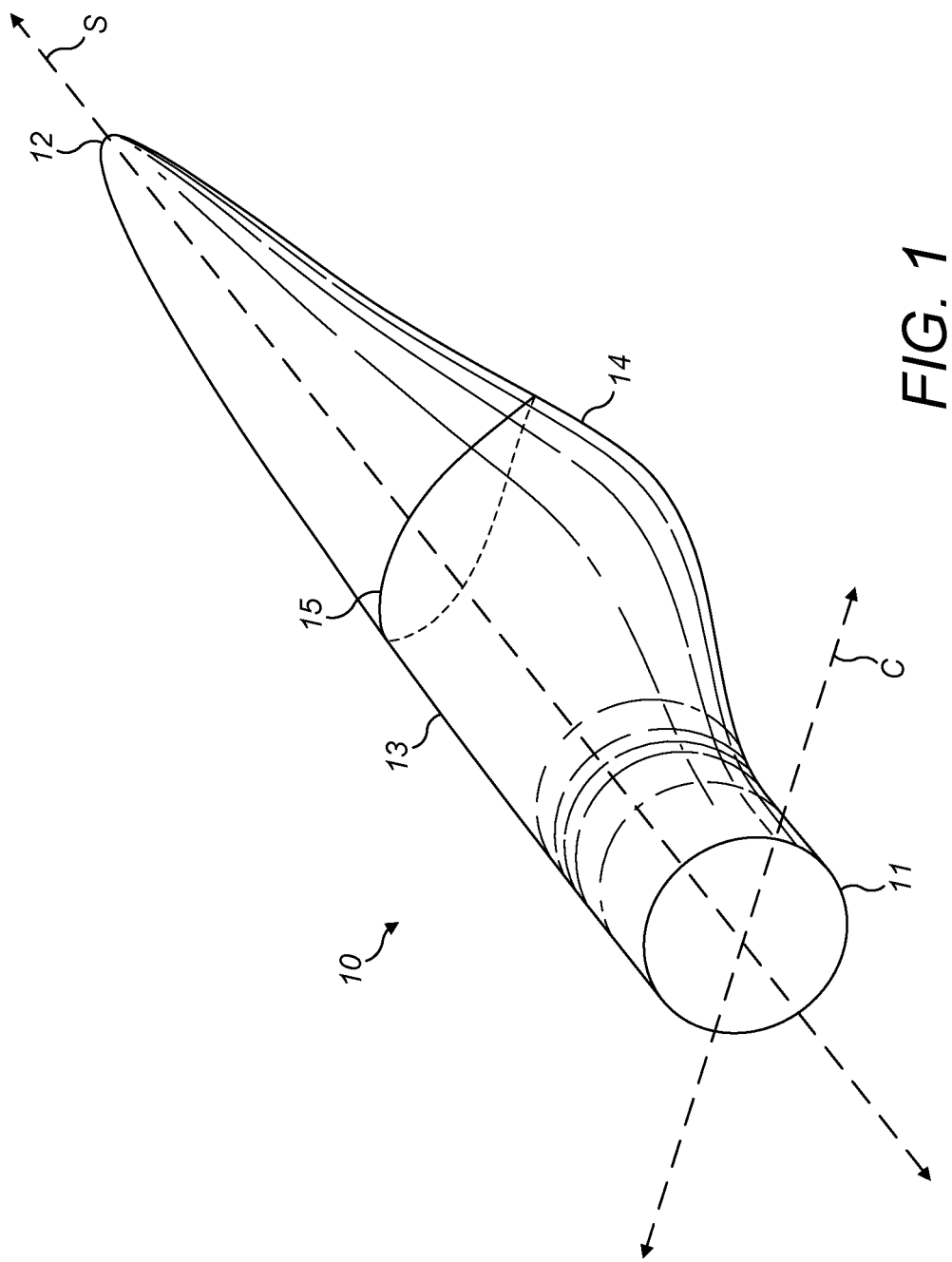
FIG. 1 is a schematic perspective view of a wind turbine blade.

FIG. 1 is a schematic perspective view of a wind turbine blade 10. The blade 10 extends longitudinally in a spanwise direction S between a root end 11 and a tip end 12, and transversely in a chordwise direction C between a leading edge 13 and a trailing edge 14. In this example, the cross-sectional profile of the blade 10 is substantially circular at the root end 11 and develops into an airfoil profile 15 moving in the spanwise direction S towards the blade tip 12.

Figure 2:
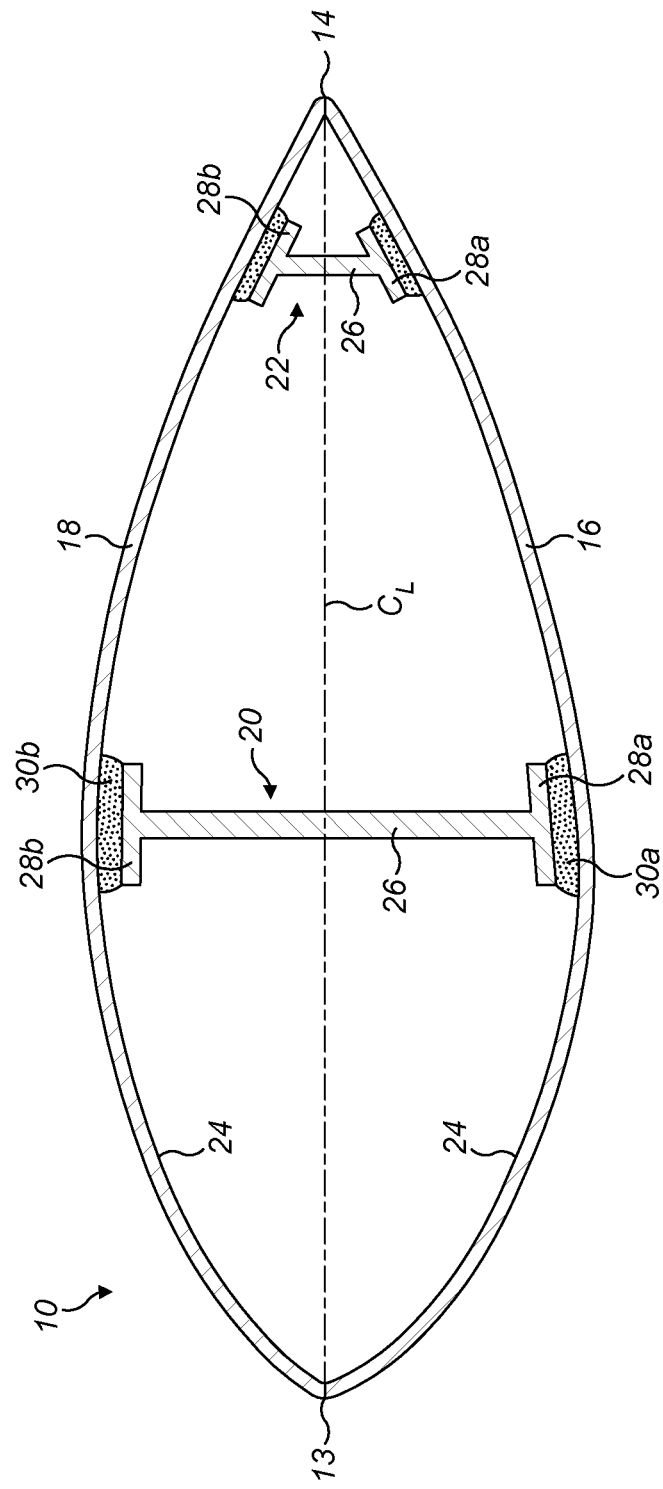
FIG. 2 is a schematic transverse cross-sectional view of the wind turbine blade.

FIG. 2 is a schematic transverse cross-sectional view of an airfoil portion of the wind turbine blade 10. The blade 10 comprises an outer shell formed from first and second half shells: a windward half shell 16 and a leeward half shell 18. A local chord $C_L$ of the blade 10 is indicated, which is a straight line extending between the leading and trailing edges 13, 14. The half shells 16, 18 are typically formed from composite materials, for example glass-fibre reinforced plastic (GFRP) and have a laminate structure. The half shells 16, 18 are bonded together along their leading and trailing edges 13, 14.

A plurality of shear webs 20, 22 are arranged inside the blade 10 to provide structural support to the blade shell. In this example, the blade 10 includes a main web 20 that provides the main shear support and a trailing-edge web 22 that provides additional shear support near the trailing edge 14 of the blade 10. The shear webs 20, 22 extend longitudinally in the spanwise direction and are bonded between respective inner surfaces 24 of the first and second half shells 16, 18. In this example, the shear webs 20, 22 are generally I-shaped in cross-section, and comprise a web panel 26 disposed between first and second mounting flanges 28a, 28b. In other examples the shear webs 20, 22 may have a different shape, for example they may be C-shaped in cross section.

The first mounting flanges 28a of the shear webs 20, 22 are adhesively bonded to the inner surface 24 of the first half shell 16 and the second mounting flanges 28b are adhesively bonded to the inner surface 24 of the second half shell 18. Accordingly, first and second shear web bond lines 30a, 30b are shown in FIG. 2.

The inner surfaces 24 of the first and second half shells 16, 18 are concave-curved moving in the chordwise direction between the leading and trailing edges 13, 14 of the blade 10. The shear webs 20, 22 are designed to accommodate this profile, for example through suitable selection of the angle of the mounting flanges 28a, 28b relative to the web panel 26. In this example, the main web 20 is arranged generally where the perpendicular distance between the first and second half shells 16, 18 is greatest. In this region, the inner surfaces 24 of the half shells 16, 18 are relatively flat, e.g. substantially horizontal as shown in FIG. 2. The mounting flanges 28a, 28b of the main web 20 are therefore generally perpendicular to the web panel 26.

The trailing-edge web 22 is arranged close to the trailing edge 14 of the blade 10, where the inner surfaces 24 of the first and second half shells 16, 18 are steeply inclined relative to the local chord $C_L$ and define a V-shape therebetween. Accordingly, the mounting flanges 28a, 28b of the trailing-edge web 22 are correspondingly inclined relative to the web panel 26 such that they are substantially parallel with the inclined inner surfaces 24 of the half shells 16, 18 at this location.

A method of making the wind turbine blade 10 will now be briefly discussed with reference to FIGS. 3 to 5.

Figure 3:
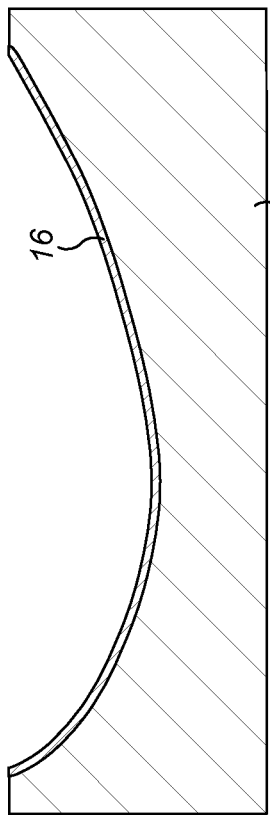
FIG. 3 shows a blade mould assembly in an open configuration and supporting first and second half shells of the blade.
Figure 3:
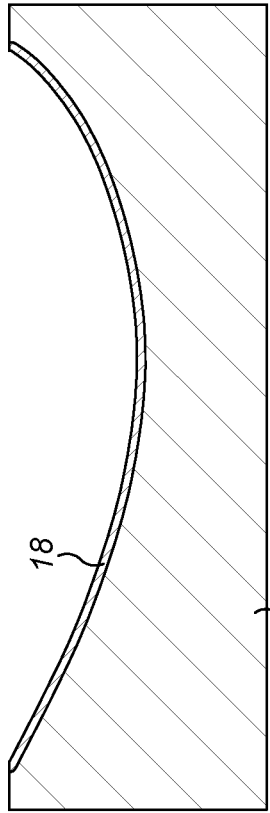

Referring to FIG. 3, this shows a blade mould assembly comprising first and second female half moulds 32a, 32b shaped respectively to form the first and second half shells 16, 18 of the blade 10. The mould assembly is shown in an open configuration in which the first and second half moulds 32a, 32b are arranged side by side. The first and second half shells 16, 18 are formed in their respective moulds 32a, 32b using techniques known to the skilled person, such as resin infusion, vacuum-assisted resin transfer moulding (VARTM) etc.

Figure 4:
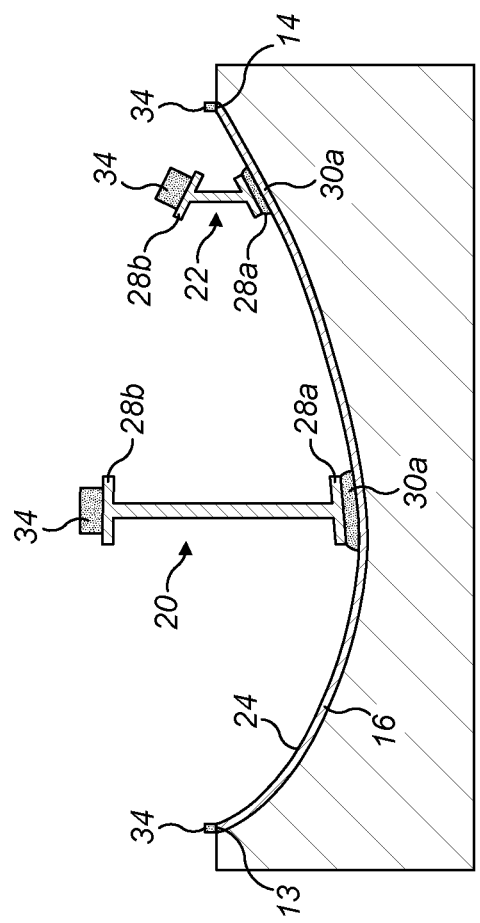
FIG. 4 shows shear webs bonded to the first half shell.
Figure 4:
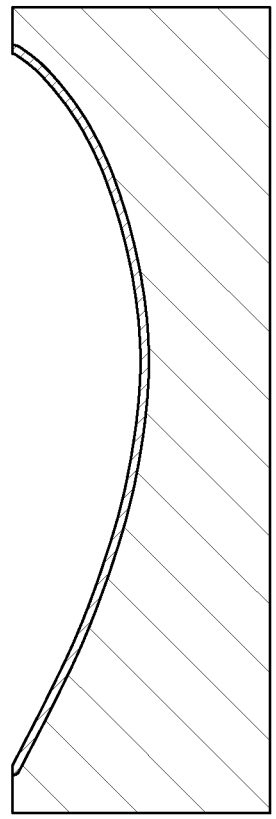

Referring to FIG. 4, this shows the shear webs 20, 22 bonded to the inner surface 24 of the first half shell 16 with the mould assembly in its open configuration. To bond the shear webs 20, 22 to first half shell 16, two lines of adhesive are initially deposited on the inner surface 24 of the first half shell 16. The shear webs 20, 22 are then lifted into the first half shell 16 and their first mounting flanges 28a are positioned on top of a respective line of adhesive. The shear webs 20, 22 are pressed against the first half shell 16 to compress the adhesive and form the first bond lines 30a. Jigs (not shown) may be used to support the shear webs during this process.

Once the adhesive in the first bond lines 30a has cured (typically after several hours), the jigs may be removed as the shear webs 20, 22 are now self-supporting. Further adhesive 34 may be applied to the second mounting flanges 28b of the shear webs 20, 22 and along the leading and trailing edges 13, 14 of the first half shell 16.

Figure 5:
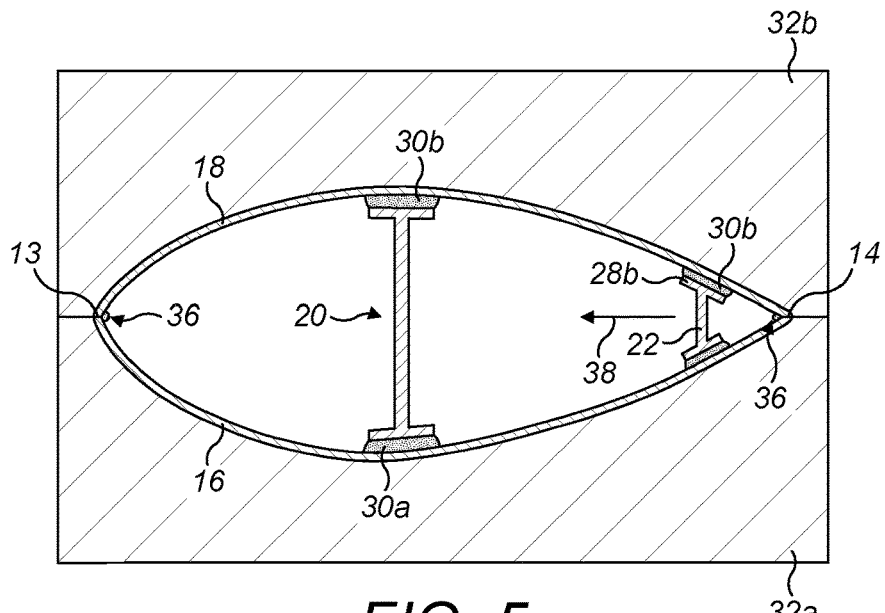
FIG. 5 shows the blade mould assembly in a closed configuration.

As shown in FIG. 5, the mould assembly is then closed by lifting and turning the second half mould 32b and positioning it on top of the first half mould 32a. The weight of the second half shell 18 and second half mould 32b bears down on the first half shell 16 causing the further adhesive 34 (indicated in FIG. 4) to compress and form the second bond lines 30b between the shear webs 20, 22 and the second half shell 18 and to form further bond lines 36 between opposed leading edges 13 and opposed trailing edges 14 of the half shells 16, 18. Once the further adhesive 34 has cured, the mould assembly can be opened and the assembled blade 10 can be removed.

During manufacture of a blade, it is difficult to ensure accurate positioning of the shear webs 20, 22 and it is difficult to ensure consistency of the bond lines 30a, 30b between the shear webs 20, 22 and the blade shells 16, 18. Bonding shear webs to inclined surfaces presents particular challenges because a slight offset in the chordwise position of a web can cause a significant change in the shear web bond line thicknesses and may cause the adhesive in the shear web bond lines to be inadequately compressed. This can result in the bond contact area between the shell and shear webs being too small, which may present a quality issue. The bond lines are often not accessible and hence rework or repair may not be possible.

During mould closure, webs that are to be bonded to inclined shell portions will experience a chordwise force from the hydraulic pressure of the adhesive when the adhesive is compressed. In the case of the trailing-edge web 22 shown in FIG. 5, the top of the web 22 near the second mounting flange 28b will be forced in the direction of the arrow 38, i.e. towards the leading edge 13 of the blade 10. As the web 22 is not particularly stiff in the chordwise direction, it cannot resist these chordwise forces without deflecting slightly in the chordwise direction. The result is that the web 22 may become twisted or otherwise displaced in the chordwise direction, leading to insufficient compression of adhesive and inadequate bond area.

An existing technique for positioning shear webs is described in applicant's PCT application WO2015197076 A1, and involves the use of rigid guide blocks secured to the inner surfaces of the half shells. The guide blocks serve to direct the shear webs towards predetermined mounting regions of the half shells when the mould is closed. The guide blocks also serve as hard stops and hold the tops of the webs in position during mould closure. However, it can be difficult to ensure the correct positioning of the guide blocks themselves due to measurement inaccuracies, and so even this technique may still result in sub-optimal positioning of the shear webs, and the formation of sub-optimal bond lines. As the web position is constrained by the guide blocks, the webs may twist or buckle during mould closure if the guide blocks are out of position. Even with guide blocks correctly positioned, part tolerances such as web height, shell thickness, mould distortion etc. can all contribute to variations in the bond lines, resulting in bond lines that may be thicker or thinner than desired.

The present invention overcomes these problems through the use of novel web locators, as will now be discussed in further detail and by way of non-limiting example with reference to the remaining figures.

Figure 6A:
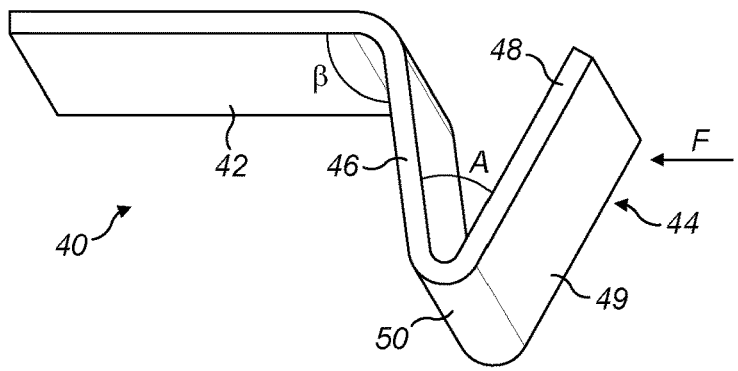
FIG. 6a is a schematic perspective view of a web locator according to a first example of the present invention in a relaxed state.

FIG. 6a is a schematic perspective view of a web locator 40 according to a first example. The web locator 40 comprises a fixed portion 42 and a spring portion 44 extending from the fixed portion 42. In this example, the fixed portion 42 comprises a base for securing to an inner surface of a half shell. The spring portion 44 is V-shaped, and comprises first and second legs 46, 48. The spring portion 44 is moveable relative to the fixed portion 42. In this example, the spring portion 44 is moveable primarily about a portion 50, which is defined at the apex of the V-shaped spring portion 44. The second leg 48 of the spring portion 44 defines a guide surface 49. In this example, the portion 50 is a flexible portion. In other examples, the portion 50 may include a hinge or other means for permitting movement of the spring portion 44.

In this example, the web locator 40 is formed as a single piece of constant cross-section. The fixed portion 42 and the spring portion 44 are contiguous. The web locator 40 may be formed of any suitable material, however it is preferably a glass fibre composite component. The web locator 40 may be made by any suitable process, for example it may be moulded or it may be formed by bending a flat strip. However, it is preferably a pultruded component. The pultrusion process is preferably used to form the web locator 40 because it can produce a continuous part of constant cross-section, which can subsequently be divided transversely into a plurality of similar web locators 40 at relatively low cost.

Figure 6B:
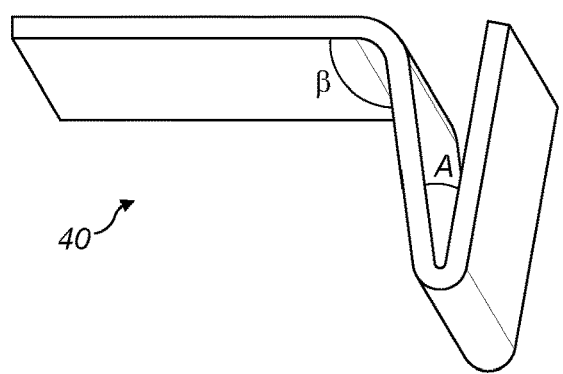
FIG. 6b is a schematic perspective view of the web locator in a compressed state.

The flexible portion 50 provides the web locator 40 with intrinsic flexibility. When a force is incident on the spring portion 44 in the direction of the arrow F, the flexible portion 50 allows the spring portion 44 to compress. In FIG. 6a the web locator 40 is shown with the spring portion 44 in a relaxed state, whilst in FIG. 6b the web locator 40 is shown with the spring portion 44 in a compressed state. When moving from the relaxed state towards a compressed state, the second leg 48 of the spring portion 44 moves towards the first leg 46 causing a reduction in an internal angle A between the legs 46, 48 at the flexible portion 50. The spring portion 44 is biased towards the relaxed state.

The function of the web locator 40 during the manufacture of a wind turbine blade 10 will now be described with reference to FIGS. 7a and 7b.

Figure 7A:
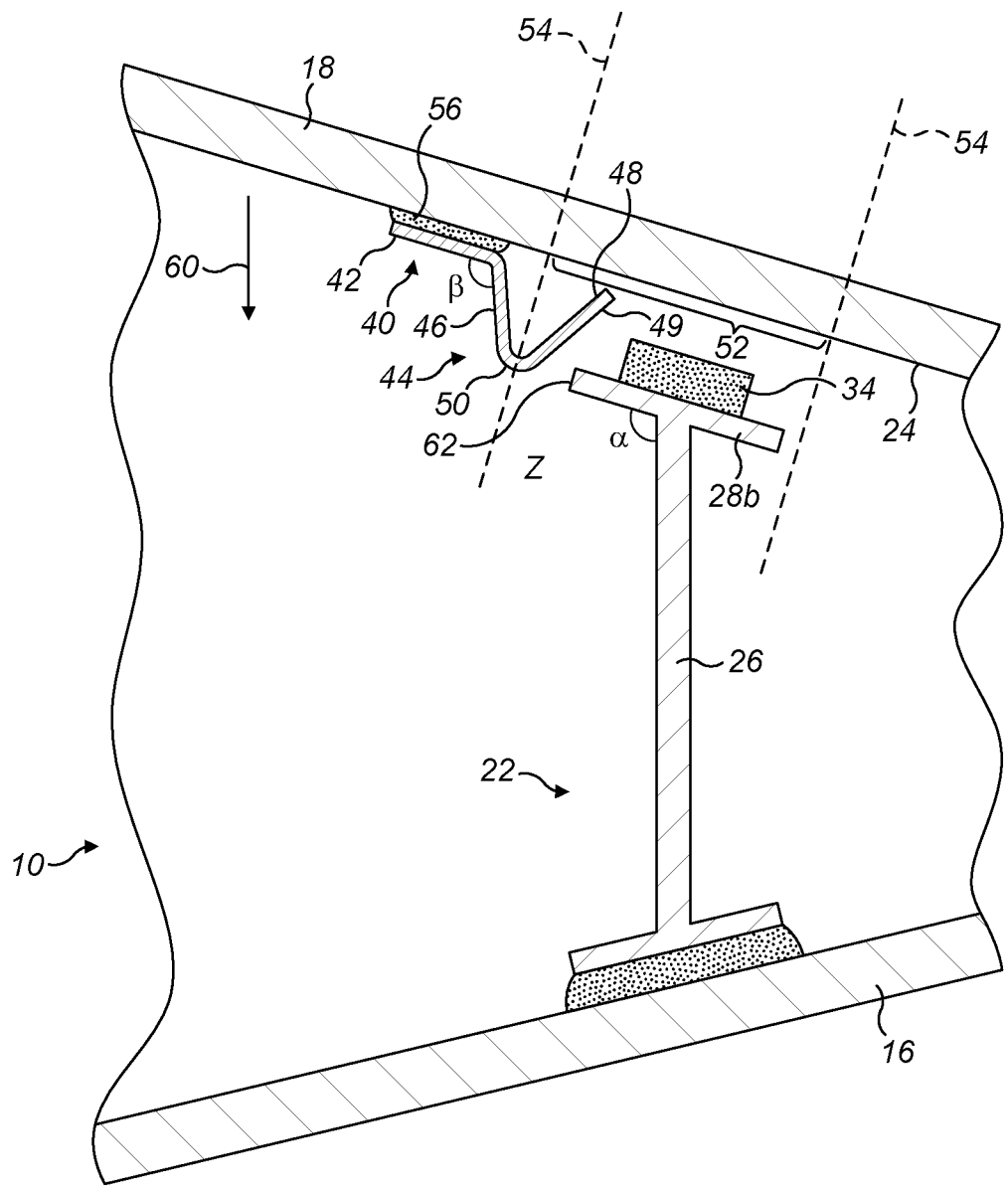
FIGS. 7a and 7b illustrate the web locator in use during assembly of a wind turbine blade.
Figure 7B:
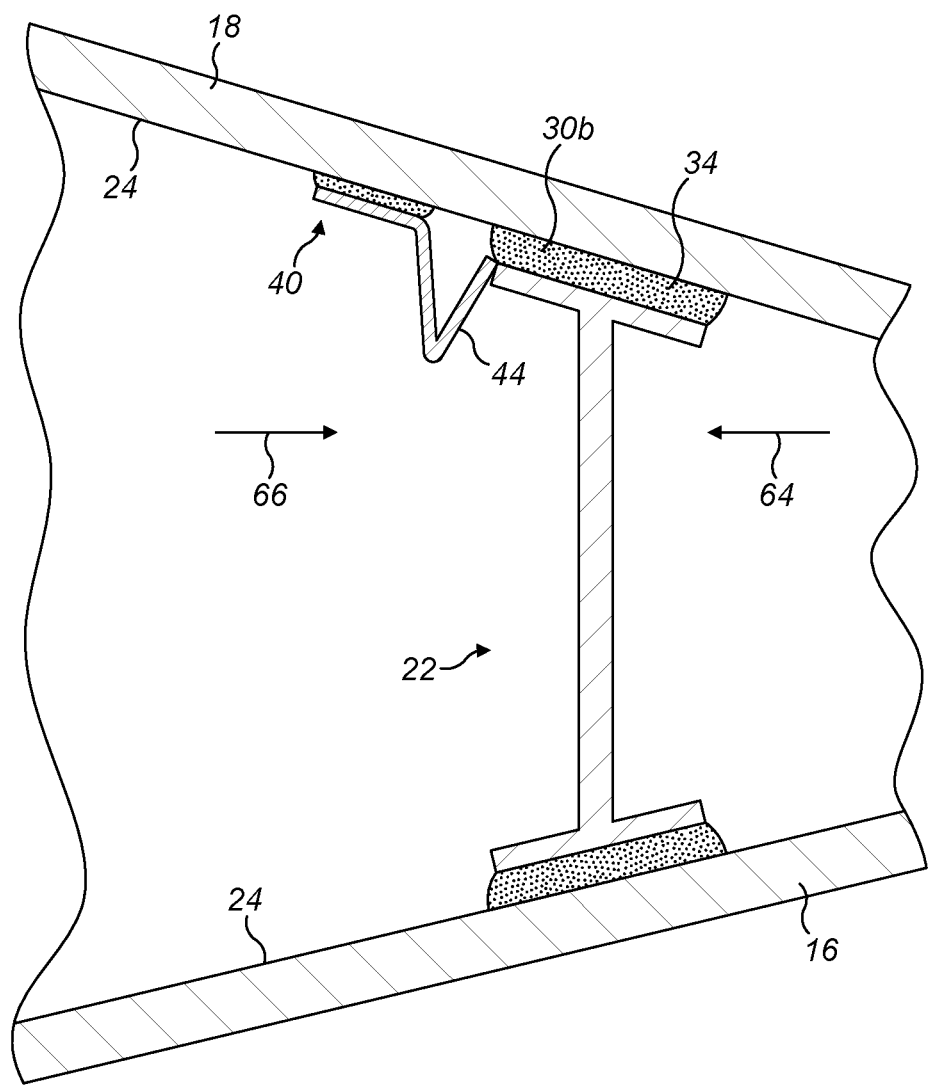

FIGS. 7a and 7b are schematic cross-sectional views of a trailing edge portion of a blade 10 during manufacture of the blade. FIG. 7a shows the second half shell 18 positioned directly above the first half shell 16 prior to closure of the blade mould assembly (not shown). A trailing-edge web 22 is shown bonded to the first half shell 16 and uncured adhesive 34 has been applied to the second mounting flange 28b of the web 22, in accordance with the method previously described with reference to FIG. 4. In other examples, the adhesive 34 could additionally or alternatively be applied directly to the inner surface 24 of the second half shell 18.

A shear web mounting region 52 is defined on an inclined portion of the inner surface 24 of the second half shell 18, near the trailing edge. The shear web mounting region 52 in FIG. 7a is the region of the inner surface 24 between the two dashed lines 54 perpendicular to the surface 24. A web locator 40 in its relaxed state is attached to the inner surface 24 of the second half shell 18. In particular, the base 42 of the web locator 40 is bonded by adhesive 56 to the inner surface 24. The web locator 40 is positioned proximate the shear web mounting region 52 such that at least part of the spring portion 44 extends in front of the mounting region 52. In other words, the at least part of the spring portion 44 extends into a zone Z defined by a projection of the mounting region 52 perpendicular to the inner surface 24 of the half shell 18. In FIG. 7a, the zone Z is the region inside the half shell 18 between the two dashed lines 54. In this example, the second leg 48 of the spring portion 44 extends in front of the mounting region 52, whilst the first leg 46 is outside the mounting region 52. The web locator 40 is mounted on the most "open" side of the web, which in this example is on a leading-edge side of the mounting region 52.

During mould closure, the first and second half shells 16, 18 are brought together with the shear web 22 arranged therebetween. In this example, the second half shell 18 is lowered towards the first half shell 16 in the direction of the arrow 60. As the second half 18 shell is lowered, an edge 62 of the second mounting flange 28b of the shear web 22 will initially come into contact with the guide surface 49 of the spring portion 44 near the flexible portion 50. During further closure of the mould, the mounting flange 28b is guided along the guide surface 49 of the spring portion 44 towards the mounting region 52. During this process, the shear web 22 compresses the spring portion 44.

FIG. 7b shows the final stage of mould closure when the second half shell 18 is completely lowered onto the first half shell 16. The adhesive 34 has been compressed and the web locator 40 is shown in a compressed state. As previously explained, during mould closure, the adhesive 34 will tend to resist compression and exert a chordwise force on the shear web 22 generally in the direction of the arrow 64. This force pushes the shear web 22 in a chordwise direction towards the leading edge of the blade 10. The web 22 is therefore pushed against the spring portion 44 of the web locator 40 causing the spring portion 44 to compress. However, as the spring portion 44 is biased towards its relaxed state, it will exert a chordwise force on the web 22 as it tries to regain its relaxed state. This force acts generally in the direction of arrow 66, i.e. in the direction of the trailing edge (i.e. from left to right in FIG. 7b). The force exerted on the web 22 by the web locator 40 therefore counteracts the force exerted on the web 22 by the adhesive 34 in direction 64. The web locator 40 therefore urges the web 22 towards the trailing edge into the V-shape defined between the inclined inner surfaces 24 of the half shells 16, 18 during mould closure.

The counteracting chordwise forces from the adhesive 34 and the web locator 40 respectively will cause the web 22 to move slightly in a generally chordwise direction during mould closure until a final equilibrium position is reached where the forces are equal. In the final position of the web 22, the web locator 40 is at least partially compressed, as shown in FIG. 7b.

The web locator 40 therefore serves to guide the web 22 into position and counteracts the force exerted by the adhesive 34 to ensure that the adhesive 34 becomes sufficiently compressed in the bond line 30b and that the web 22 is suitably positioned.

The final equilibrium position of the shear web 22 will vary depending upon a number of factors including the part tolerances discussed previously. However, the web locator 40 enables the final position to be set within a certain tolerance or 'bandwidth', which is governed by the maximum displacement of the spring portion 44 between fully relaxed and fully compressed states.

The flexible web locators 40 described herein therefore permit a small amount of chordwise displacement of the shear web 22 during mould closure, which results in consistent shear web bond lines being produced. The disadvantages associated with the use of rigid guide blocks are therefore avoided, and part tolerances can be accommodated without compromising the bond lines.

A plurality of web locators 40 are preferably attached to the inner surface 24 of the second half shell 18. The web locators 40 are preferably spaced at intervals along the length of the web mounting region 52. A common design of web locator 40 may be used or web locators having a different geometry may be used at different spanwise locations to accommodate a varying spanwise geometry of the shear web 22. For example, referring again to FIG. 7a, the angle α of the shear web mounting flanges 28b with respect to the web panel 26 may vary along the length of the web 22 to accommodate the changing profile of the blade 10. The web locator 40 may advantageously be designed such that an angle β between the base 42 and the spring portion 44 is the same as or similar to the angle α, for example within +/−15 degrees. In practice, two or three variants of the web locator 40, each having a different angle β may be used along the length of the web 22 to accommodate a varying geometry.

The blade assembly process that was described above is a two-stage process. In the first stage, the shear web 22 is bonded to one half shell 16 and the adhesive is cured. In the second stage, the mould is closed and the shear web 22 is then bonded to the second half shell 18. The two-stage process is advantageous because the mould is open during the first stage so the shear web 22 is fully accessible and can be supported with jigs to ensure accurate positioning of the web 22 and a precisely controlled bond line 30a (see FIG. 2) with the first half shell 16. The shear web 22 is then advantageously self-supporting during mould closure. However, the two-stage process is time consuming because several hours must be allowed for the adhesive in the first shear web bond line 30a to cure before the second stage can commence.

Alternatively, a single-stage assembly process may be used in which the adhesive on both sides of the shear web 22 is uncured during mould closure. The adhesive in the first and second bond lines 30a, 30b (see FIG. 2) is therefore compressed simultaneously during mould closure. A single-stage process can be performed more quickly than the two-stage process since it avoids the need to wait for adhesive to cure before mould closure. However, it presents additional challenges because the web 22 cannot be supported by jigs during mould closure and hence there is a greater potential for the web 22 to move out of position because neither side of the web 22 is fixed. The problem is particularly present when bonding webs to inclined surfaces of the shell, such as in the case of a trailing-edge web 22. As discussed previously, if the webs move away from their designed position, then this may compromise the bond lines 30a, 30b, for example leading to insufficient compression of adhesive.

The use of flexible web locators during a single-stage assembly process will now be described by way of example with reference to FIGS. 8a and 8b.

Figure 8A:
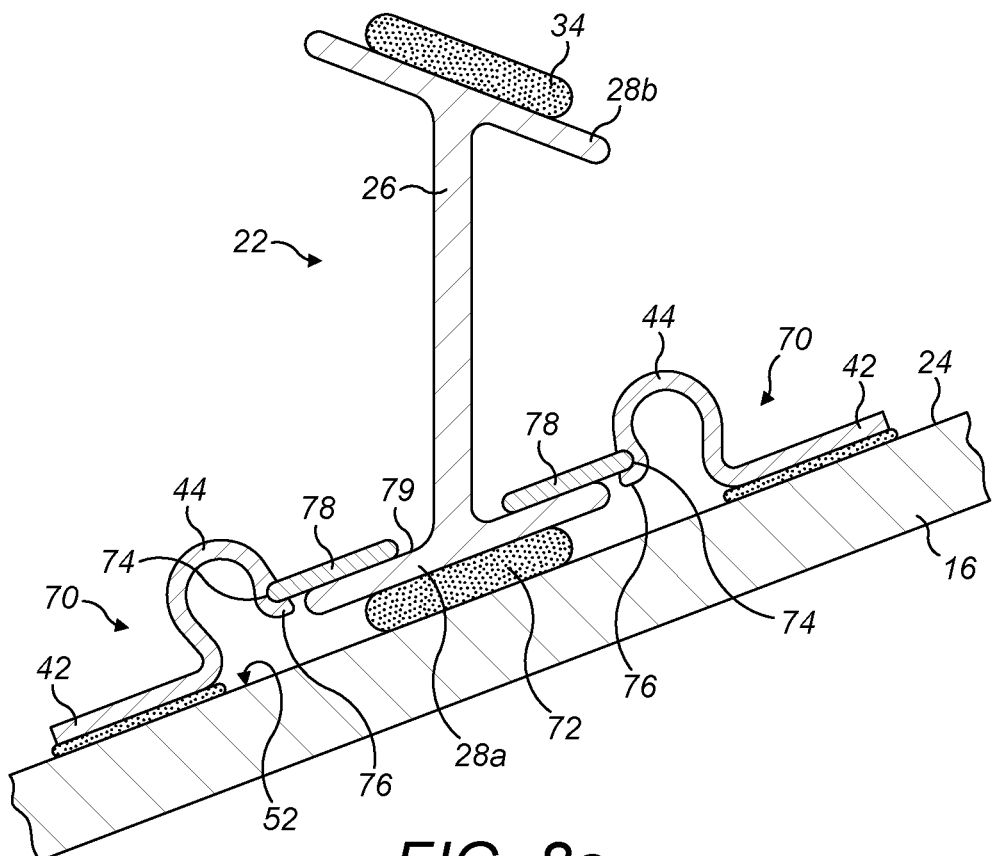
FIGS. 8a and 8b show a web locator according to a second example of the present invention being used in a single-stage blade assembly process.

FIG. 8a shows a trailing-edge web 22 supported against a first half shell 16 by a pair of web locators 70 according to a second example. A line of uncured adhesive 72 is deposited in a shear web mounting region 52 on an inclined portion of the inner surface 24 of the first blade shell 16. The trailing-edge web 22 is arranged with its first mounting flange 28a on top of this uncured adhesive 72.

Further uncured adhesive 34 is deposited on the second mounting flange 28b. One of the web locators 70 is mounted on a leading-edge side of the mounting region 52 and the other web locator 70 is mounted on the trailing-edge side of the mounting region 52. As will be described below, the web locators 70 in this example serve to support and stabilise the web 22 during the single-stage join-up, in addition to balancing the chordwise forces on the web 22 exerted by the adhesive 72.

In this example, the web locators 70 generally have a swan profile and may be of constant cross-section. The swan profile comprises a fixed portion 42 in the form of a planar base, and a spring portion 44 in the form of a curved neck that extends from the base 42. The base 42 is adhesively bonded to the inner surface 24 of the first half shell 16. The spring portion 44 is flexible by virtue of its curved shape. A groove 74 is provided at a free end 76 of the neck 44. The groove 74 is elongate and extends perpendicular to the page, i.e. in a spanwise direction when the web locator 70 is mounted as shown in FIG. 8a.

In common with the previous example, the web locator 70 is preferably a glass-fibre pultruded component, but may be formed from other suitable materials and/or using other suitable techniques as previously described.

First and second tabs 78 are attached to an inner surface 79 of the first mounting flange 28a of the shear web 22, respectively on either side of the web panel 26. An edge portion of the tabs 78 extends beyond the edges of the first mounting flange 28a and is received in the groove 74 of a web locator 70. The tabs 78 are preferably adhesively bonded to the first mounting flange 28a, for example during manufacture of the web 22. A jig may be used to ensure an accurate positioning of the tabs 78.

When the shear web 22 is positioned on top of the uncured adhesive 72 the tabs 78 are guided over the surface of the swan necks 44 until the tabs 78 click into the respective grooves 74. The mounting flange 28a is thereby guided towards the mounting region 52. By virtue of the engagement between the tabs 78 and the grooves 44, the web locators 70 serve to stabilise the shear web 22 and prevent it from leaning or tipping over on the inclined shell surface 24.

Figure 8B:
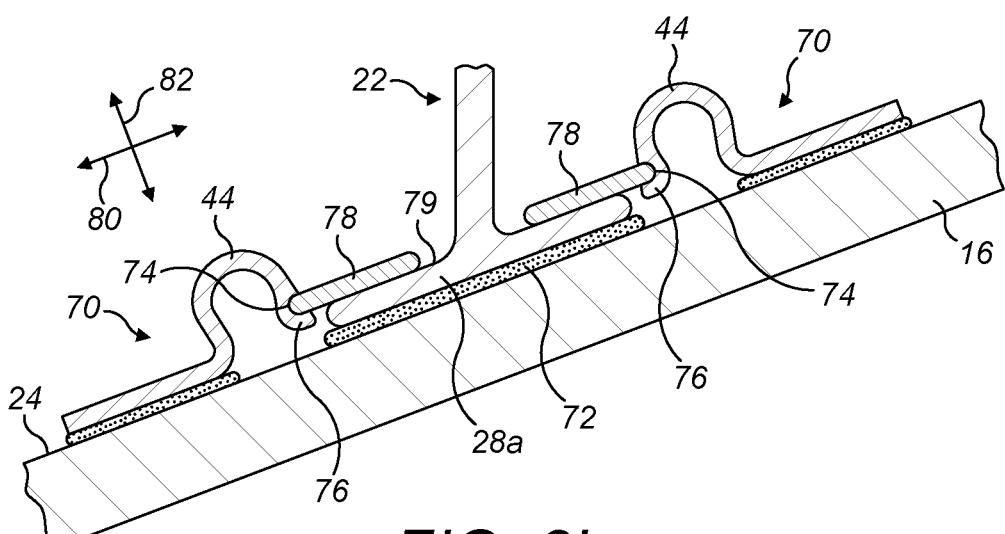

Referring now to FIG. 8b, this shows the situation during mould closure in the single-stage assembly process. When the mould is closed, the shear web 22 is forced downwards towards the first half shell 16 causing compression of the uncured adhesive 72 in the first bond line. The swan necks 44 of the web locators 70 flex downwardly towards the inner surface 24 of the half shell 16 to accommodate this movement. The free ends 76 of the swan necks 44 have an 'underbite', which prevents the tabs 78 from clicking out of the grooves 74 during this process. As the tabs 78 are mounted to the inner surfaces 79 of the first mounting flange 28a (i.e. above the flange thickness) the free ends 76 of the swan necks 44 will not reach the inner surface 24 of the blade shell 16 and so will not obstruct the adhesive 72 as it compresses and spreads beneath the web flange 28a.

In common with the previous example, the web locators 70 of the second example have relaxed and compressed states. The web locator 70 is resiliently biased towards its relaxed state. The web locators 70 are located such that at least part of the swan neck 44 extends into the shear web mounting region 52 when the web locators 70 are in their relaxed state. Engagement of the shear web 22 with the web locators 70 causes the swan neck 44 to flex such that the web locators 70 adopt a compressed state.

As well as stabilising the web 22 during mould closure, the web locators 70 function in a similar way to the web locators 40 of the first example to counteract the chordwise forces on the web 22 during adhesive compression. In particular, the curved swan neck 44 can flex back and forth in the direction of arrow 80 as well as up and down in the direction of arrow 82. When the adhesive 72 in the first bond line is compressed, it will tend to force the shear web 22 in a chordwise direction towards the leading edge of the blade in view of the V-shape between the first and second half shells at the trailing edge. The web 22 is therefore pushed towards the web locator 70 on the leading-edge side of the web 22. This causes the swan neck 44 to compress and exert a reactive force on the shear web 22 in the opposition direction. As with the previous example, the web 22 will move in the chordwise direction during mould closure until it naturally reaches a final equilibrium position when these opposing forces are balanced. The web locators 70 therefore permit some chordwise movement of the shear web 22 and ensure consistent bond lines are produced.

The web locators 70 are preferably spaced at intervals along the length of the shear web mounting region. The tabs 78 allow a single design of swan profile to be used along the length of the web 22. Adjustment in the tab jigs and bond thickness between the tabs 78 and the web flange 28a can be used to adjust the height and angle of the web 22, providing further control of the bond lines 30a, 30b (see FIG. 2) between the web 22 and shells 16, 18.

Whilst not shown in FIG. 8b, web locators 40, 70 according to the first and/or second example are also preferably mounted to the inner surface of the second half shell in substantially the same way as previously described in relation to the first example. The swan profiles do not limit the chordwise movement of the upper end of the shear web, which was previously described in connection with the first example.

Therefore, it will be seen that flexible web locators 40, 70 provide advantages in both a two-stage and a one-stage join up process. In the one-stage join-up the web locators advantageously enable a jig-less assembly process. The web locators of the second example could equally be used in a two-stage join-up process to eliminate the use of jigs.

Preferably the web locators are not removed from the blade after the blade is assembled. In other words, the web locators preferably remain permanently attached to the blade. The web locators are relatively small, lightweight and inexpensive components and therefore do not add significantly to the cost or weight of the blade.

Figure 9:
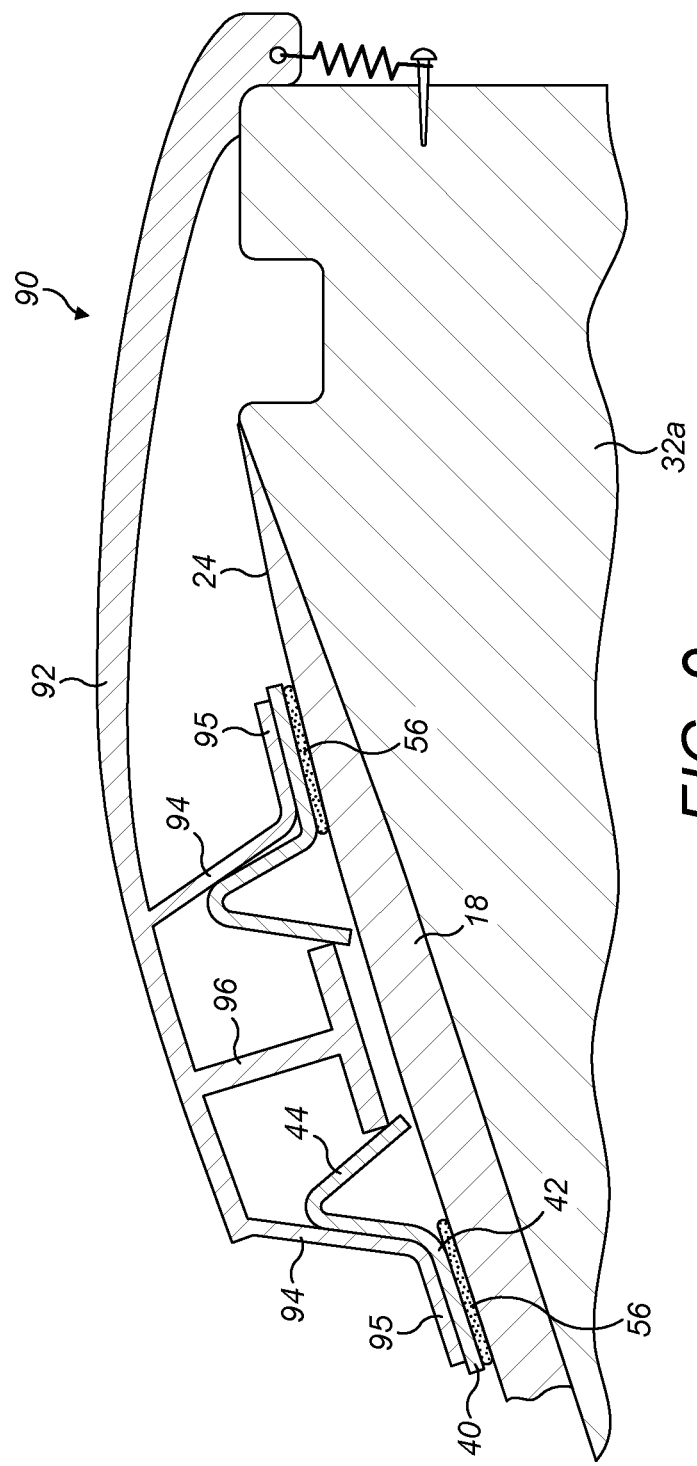
FIG. 9 shows a tool for positioning web locators on the surface of a half shell.

FIG. 9 shows a positioning tool 90 for accurately positioning web locators against the surface 24 of a half shell 16. The tool comprises an arm 92 that is pivotally connected at one end to a fixed location of the half mould 32a. In this example the tool 90 is connected to the trailing edge of the half mould 32a. The other end of the arm includes a pair of legs 94 that extend transversely from the arm 92. The legs 94 include feet 95 that splay outwardly from the ends of the legs 94. A simulated web foot 96 extends from the arm 92 between the legs 94. The web foot 96 in this example is T-shaped, and the shape of the web-foot 96 is selected to correspond to the shape of the shear web 22 to be positioned at the particular location of the tool 90. The legs 94 and feet 95 of the tool 90 are shaped to overlay the base 42 and spring portion 44 of the web locators 40.

The trailing edge of the mould provides an accurate location point for the tool 90. In order to attach the web locators 40 to the shell 16, the arm 92 is pivoted into the position shown in FIG. 9, and the web locators 40 are arranged in place between the legs 94 and the simulated web foot 96. Adhesive 56 is applied between the bases 42 of the web locators 40 and the shell 16 and the weight of the tool 90 exerts sufficient force on the web locators 40 to compress the adhesive 56. A similar tool can be used to locate the web locators against the second half shell 18.

A similar tool can also be used for positioning the web locators 70 of the second example, in which case the shape of the legs may be adapted to correspond to the outer profile of the swan necks 44.

The tool 90 can also be used to position the web locators 40, 70 singly, as well as in pairs as shown in FIG. 9. A plurality of tools 90 may be spaced along the moulds 32*a*, 32*b*, with the geometry of the respective tools 90 corresponding to the geometry of the web 22 and web locators 40, 70 at those locations.

Whilst the web locators 40, 70 have been described in the context of the trailing edge web 22, the web locators 40, 70 are also suitable for use in connection with a leading-edge web or a main web, which may also be mounted on an inclined shell surface. In this case, a web locator would be positioned at least on a trailing-edge side of the web such that the web is pressed towards the leading edge during mould closure. Furthermore, the web locators 40, 70 may also be used on non-inclined surfaces and can therefore be used to support and/or guide a main shear web 20 in a one-stage or two-stage assembly process.

In an example, the web locator 40, 70 has a length (in the spanwise direction S of the blade 10) of 100 mm. There may be one or two web locators 40, 70 per meter span of shear web 20, 22. When the spring portion 44 of the web locator 40, 70 is compressed, from the relaxed state to the compressed state, it may move up to 30 mm, or even up to 50 mm (in the chordwise direction C). Such a compression may provide a spring force of approximately 0.5 to 1.5 kN.

Whilst the web locators 40, 70 described in the above examples have intrinsic flexibility, in other examples the spring portion of the web locator may incorporate a separate mechanical spring or other such biasing means. Web locators of further examples may include a mechanical hinge between the fixed portion and the spring portion.

In other examples, the swan profile web locators 70 described in the second example may be replaced by V-shaped web locators 40, such as those described in the first example. Likewise, the swan profile web locators 70 may be used in place of the V-shaped web locators 40 in the first example. In all examples, web locators 40, 70 may be used with or without the tabs 78 and grooves 74 described above.

Many other modifications may be made to the above examples without departing from the scope of the present invention as defined in the accompanying claims.

The invention claimed is:

1. A method of making a wind turbine blade, the wind turbine blade extending longitudinally in a spanwise direction and extending transversely in a chordwise direction between a leading edge and a trailing edge, the method comprising:

providing a first half shell and a second half shell to be joined together, each of the first half shell and the second half shell comprising an inner surface having concave curvature in the chordwise direction that defines an inclined portion of the inner surface that is inclined relative to a local chord of the wind turbine blade;

defining a shear web mounting region on the inclined portion of the inner surface of one of the first half shell or the second half shell;

providing a web locator having a fixed portion and a spring portion extending from the fixed portion, the spring portion being moveable relative to the fixed portion between a compressed state and a relaxed state, and the spring portion being biased towards the relaxed state;

attaching the fixed portion of the web locator to the inner surface of the one of the first half shell or the second half shell proximate to the shear web mounting region such that at least part of the spring portion extends in front of the shear web mounting region;

providing a shear web having a mounting flange for bonding to the shear web mounting region;

providing adhesive on the mounting flange and/or on the shear web mounting region;

bringing the first half shell and the second half shell together with the shear web arranged therebetween, such that the mounting flange is guided by a surface of the spring portion of the web locator towards the shear web mounting region and the spring portion compresses; and compressing and curing the adhesive.

2. The method of claim 1, wherein the spring portion of the web locator in the compressed state exerts a first chordwise force on the shear web that counteracts a second chordwise force on the shear web exerted by the adhesive, and wherein the first chordwise force and the second chordwise force cause chordwise movement of the shear web until the mounting flange reaches an equilibrium position within the shear web mounting region where the first and second chordwise forces are equal.

3. The method of claim 1, wherein the shear web is a trailing edge web for location near the trailing edge of the wind turbine blade, and the method comprises attaching the web locator on a leading-edge side of the shear web mounting region, wherein the web locator urges the shear web towards the trailing edge when the first half shell and the second half shell are brought together.

4. The method of claim 1, wherein prior to attaching the web locator to the inner surface of the one of the first half shell or the second half shell, the method comprises accurately positioning the web locator on the inner surface of the one of the first half shell or the second half shell using a positioning tool attached to a predetermined location of a blade mould in which the one of the first half shell or the second half shell is supported.

5. The method of claim 4, wherein the positioning tool comprises an arm that is pivotally connected to the blade mould.

6. The method of claim 1, comprising attaching a pair of web locators respectively on a leading-edge side and a trailing-edge side of the shear web mounting region, wherein the web locators are configured to engage with the mounting flange or with a tab attached to the mounting flange such that the shear web is stabilised by the web locators and prevented from tipping.

7. A wind turbine blade comprising:

a first half shell and a second half shell bonded together;

a shear web bonded inside the wind turbine blade between respective inner surfaces of the first half shell and the second half shell, the shear web including a web panel and a mounting flange; and one or more web locators attached to the inner surface of one of the first half shell or the second half shell, each of the one or more web locators comprising:
- a fixed portion for attaching to the inner surface of the one of the first half shell or the second half shell; and
- a spring portion for guiding the shear web towards a mounting region on the inner surface of the one of the first half shell or the second half shell, the spring portion being moveable relative to the fixed portion between a compressed state and a relaxed state, and the spring portion being biased towards the relaxed state, wherein the spring portion contacts an edge portion of the mounting flange of the shear web or contacts an edge portion of a tab attached to the mounting flange of the shear web.

8. The wind turbine blade of claim 7, wherein the spring portion of the web locator is configured to exert a chordwise force on the shear web in use when in the compressed state.

9. The wind turbine blade of claim 7, the web locator further comprising a flexible portion configured to allow the spring portion to move relative to the fixed portion.

10. The wind turbine blade of claim 7, wherein the spring portion of the web locator is V-shaped.

11. The wind turbine blade of claim 7, wherein the web locator has a swan profile in which the fixed portion comprises a base and the spring portion comprises a curved neck extending from the base.

12. The wind turbine blade of claim 7, wherein the spring portion of the web locator comprises a groove for receiving the edge portion of the mounting flange of the shear web or the edge portion of the tab attached to the mounting flange of the shear web.

13. The wind turbine blade of claim 7, wherein the web locator is a pultruded component.

14. The wind turbine blade of claim 7, wherein the or each of the one or more web locators is in the compressed state.

* * * * *